Patented Nov. 29, 1932

1,889,712

UNITED STATES PATENT OFFICE

JOHN T. TRAVERS AND OLIVER M. URBAIN, OF COLUMBUS, OHIO, ASSIGNORS, BY DIRECT AND MESNE ASSIGNMENTS, TO THE OHIO SANITARY ENGINEERING CORPORATION, OF COLUMBUS, OHIO, A CORPORATION OF OHIO

FERTILIZER

No Drawing. Application filed August 25, 1928. Serial No. 302,152.

This invention relates to the provision of an improved fertilizer or plant food and is predicated upon the discovery that the fertility of a soil is primarily dependent upon two important factors, namely, the presence in the soil of a substantial content of dispersible colloidal matter and the presence in the soil of the essential food elements for the plants.

We have determined that the colloidal content of a soil is responsible for most, if not all, activities of the soil, both chemical and physical. One of the outstanding reasons for the necessity of a large colloidal content in a soil is the enormous specific surface of all colloids. For example, we have found that at least 98% of the exposed surface of a silt loam soil containing 20% of colloidal matter, is due entirely to such colloidal content.

The colloidal content of a soil governs to a large extent the rate at which chemical reactions will take place in the soil, for, under Wenzel's law, "The reaction velocity of solids with liquids is proportional to the area of contact," it follows that the rate at which the essential food elements in the soil are made available for plant food is proportional to the surface exposed by the soil particles and therefore dependent upon the colloidal content of the soil.

All soils possess an attractive power for water. The magnitude of this power varies directly with the colloidal content of the soil. The more colloidal a soil, the greater its hygroscopicity. Water is held in soil by adhesive force. This adhesive force increases as the water content of the soil decreases and is far greater in a soil having a high colloidal content than in one of low colloidal content.

It will thus be appreciated that the presence of colloids in soil tends to prevent the dessication of the soil during dry weather conditions. The colloids also affect the water holding capacity of the soil. The colloids possess the power to take up relatively large quantities of water which causes a swelling of the colloids and a resultant increase in the volume of a given weight of soil having a high colloidal content, thus allowing such a given weight of soil to take up more water than it would otherwise do. Since the colloids swell upon taking up water, it follows that the capillary pores of the soil are thus constricted or closed up. This creates a greater friction to the passing of water into the soil and prevents the same from becoming waterlogged during periods of excessive rainfall. The soil colloids, furthermore, cause a lowering of the freezing point of soil moisture. The greater the colloidal content, the lower the freezing point is depressed. Unfrozen water is present in frozen soil as capillary adsorbed water in the colloidal matter. The amount of unfrozen water is therefore dependent upon the colloidal content of the soil. The presence of the colloidal matter in the soil is, therefore, extremely important where winter crops, such as wheat, are raised. Physically, the colloidal content of the soil acts to bind the particles of soil together in the form of a granular mass preventing them from being blown or washed away.

Since the normal soil colloids consist partially of double silicates of the alkali or alkaline earth metals, they possess the capacity to neutralize the acids formed in the soil as a result of the bacterial decomposition of the organic matter therein, thus maintaining the soil in a sweetened condition. This neutralizing capacity is effective over prolonged periods since the neutralizing constituents of the colloids are sparingly soluble and are released only as a result of hydrolysis. This phenomenon of neutralization of the acids formed in the soil by the colloids is properly termed a buffer action.

The manner in which the presence of plant food values in soil in colloidal form regulates and conserves the supply of essential food elements for plant life is best illustrated by a consideration of the elements, nitrogen and potassium.

Heretofore in the production of fertilizers, no consideration has been given to the importance of the colloidal content of the soil, nor has it been realized that plant food values should be added to the soil in dispersible form.

The known fertilizers have heretofore been provided with the idea in mind to supply to the soil the essential plant food elements such as nitrogen, phosphorus and potassium in a form such that they readily enter into solution and are theoretically immediately made available for plant life. Nitrogen has heretofore been generally added to soil in the form of a soluble salt, such as sodium nitrate or ammonium salts oxidizable to nitrates by the soil bacteria. When such soluble salts are supplied to the soil, it is apparent that should a heavy rainfall occur the soluble salts at once go into solution and are carried away by the drainage water and lost. This is commonly termed, "leaching out." The same is true of soluble potassium salts when supplied to the soil.

When such soluble salts are supplied to the soil, they are, to a large extent, dissipated and lost long before they are required by the plant life. In tests carried out by the United States Department of Agriculture, it has been shown that for a crop like wheat, best results are obtained when using sodium nitrate as a fertilizer, when the same is applied after the crop is well advanced. The real reason for this, we believe to be, that when the sodium nitrate is applied at the time the wheat is sown, the soluble nitrates are washed from the soil long before required by the crop.

Since soluble mineral fertilizers, when applied to soil, are rapidly dissipated by leaching out, it follows that the full benefit of the application of such fertilizers to the soil is never realized. A far greater percentage of such fertilizers is dissipated by leaching out than is assimilated by the plant life for which purpose it is applied to the soil.

It is the purpose of the present invention to provide a plant food and fertilizer which will improve the conditions of the soil by increasing its colloidal content and which will further supply to the soil essential plant food elements in such form that they will not be dissipated by leaching out, but will be available for assimilation by plant life throughout an entire season and in some instances for much longer periods.

The objects of the present invention are attained by providing a fertilizer or plant food composed principally of dispersible colloidal matter and containing substantial quantities of essential plant food elements in relatively insoluble colloidal form. The fundamental reasons why plant food values when in colloidal form are not dissipated from the soil by leaching out or carried away by surface water, are, that the gels of the soil act as colloidal membranes. While the dispersion of the colloids is percolating through the soil, the colloids are retained by the gel, much the same as by a dializing membrane. Whereas, when the plant food values are in solution in the form of crystalloids, they will readily pass through the gels of the soil.

The particular characteristics of a given soil will, to a large extent, govern the composition of the fertilizer or plant food best adapted for that particular soil. It may well occur that a given soil will have a substantial colloidal content, but will be deficient in essential plant food values, whereas another soil may not be so deficient in plant food values but its colloidal content will be so low that the fertility thereof is substantially impaired. We have found that productive virgin soils have relatively high colloidal contents, frequently exceeding 50 or 60%, whereas worn out, non-productive soils have extremely low colloidal contents, frequently below 10%. It will be appreciated that as the colloidal content of the soil is reduced, the soil loses to a corresponding extent those beneficial characteristics of the colloidal content hereinbefore enumerated. We find that the greater the colloidal content, the better the soil, and that the colloidal content of no soil should ever be permitted to decrease below 15%. It will be at once appreciated that the composition of colloidal matter and plant food values may be so controlled as to meet the demands of such soils. Since it is our purpose to provide the plant food values in colloidal form, the addition of plant food values as found in our fertilizer to a soil will, of necessity, increase the colloidal content of the soil.

We have found that it is possible to produce fertilizers conforming to our invention by several methods. A preferred fertilizer, conforming to our invention, however, is a sludge product obtained from a process of purification of organic waste liquids such as for example, domestic sewage, waste liquids discharge from tanneries, canneries, creameries, cheese factories, strawboard factories and the like. The sludge products employed in our fertilizer are obtained by treating these organic waste liquors, containing colloidal matter in dispersion, in accordance with the purification process more fully set forth in U. S. Patent No. 1,672,587, which, in the main, comprises the incorporation in an organic waste liquor containing colloidal matter in dispersion, of an alkali in such quantity as to maintain the pH of the liquor at a value which will cause all colloids present in the liquor to carry a complete negative charge, adding to the waste liquor an electrolyte producing material, adapted to dissociate and supply positive ions for adsorption by the negatively charged colloids, neutralizing the charge of the colloids to the isoelectric point and the separating of the precipitated colloidal matter from the waste liquor by the incorporation therein of a suitable coagulant.

These sludges obtained from organic waste liquids, in accordance with this process, contain a very substantial percent of re-dispersible colloidal matter. By re-dispersible colloidal matter, as used in this specification, we mean precipitated colloidal matter which may be deflocculated and re-dispersed in a soil solution.

In addition to the re-dispersible colloidal matter content, the sludges contain the plant food values, nitrogen, phosporus and potassium, in such form that the same are not dissipated, but are available for the plant life over prolonged periods.

In these sludges, the nitrogen is present in the form of proteins which represent re-dispersible colloidal matter. The nitrogen is made available when the sludge is applied to the soil by the bacterial decomposition of the proteins which yield, first ammonia and then nitrates. The bacterial decomposition of the proteins is governed, more or less, by the laws of mass action, in that, the greater the quantity of available nitrates in the soil, the slower will be the bacterial decomposition of the protein. It therefore follows that as the nitrates as assimilated by the plane life, and the content of nitrates in the soil decreased, the bacterial decomposition of the proteins will be thereby accelerated with a resultant formation of additional nitrates.

The plant food element, phosphorus, is usually present in the sludges as di-basic calcium phosphate, or a complex combination of a protein or potassium with calcium phosphate. The form in which the phosphate will be present in the sludge will, of course, depend upon the character of the organic waste liquid from which the sludge has been derived. For example, if the sludge be that obtained from the treatment of waste liquids from the manufacture of strawboard, the phosphates will be present as di-basic calcium phosphate. If the sludge has been derived from the treatment of a waste liquid such as whey, from the manufacture of cheese, the phosphates will be present as the double salt of potassium and calcium. Whereas, if the sludge has been derived from the waste liquids discharged from an ordinary creamery, the phosphates will be present in the form of casein-calcium-phosphate. In any instance, the phosphates of the sludge are present in re-dispersible colloidal form. The phosphates of the sludge, when applied to the soil, are insoluble in water and are therefore not subject to being carried away by surface water due to excessive rains, that is, they are not subject to leaching out. While we are not certain, it is our firm belief that the phosphates are assimilated by the plant life while in colloidal form. We do know that when phosphates in the form in which they are found in the sludges are applied to soil, they are not leached out of the soil, but remain available for the assimilation by the plant life over prolonged periods and that they do ultimately reach the plant life.

The potassium in all these sludges exists as double colloidal salts usually the silicates, but in some cases the phosphates. As in the case of the other plant food values present in the sludges, the potassium is likewise in the forms above given, present in the sludge in re-dispersible colloidal form. It is insoluble and not subject to leaching out. We do not know whether the plant life extracts its potassium from the double silicate, leaving the normal silicate, or whether the plant life assimilates the double silicate as such.

Since it has been conclusively demonstrated that soil life will assimilate silica-gels, we are constrained to the belief that the plant life assimilates its potassium by taking up the double silicate as such. In any event, due to the fact that the potassium is present in the sludge in an insoluble colloidal form, it remains available for the plant life over prolonged periods and the content thereof depreciated only as taken up by the plant life.

In some instances, we have found that the sludges obtained from certain organic waste liquids do not contain as large a percentage of plant food values as it is desired to impart to a particular soil. To the end that an adequate content of plant food values may be present in the fertilizer, we have devised methods of obtaining such plant food values as nitrogen, potassium and phosphorus in such forms as may be applied to the soil, either singly or in combination with the sludge, which are not subject to leaching out. We provide the plant food element, nitrogen, in the form of the insoluble double silicate, namely, ammonium alumino-silicate, which double silicate, it will be appreciated, is naturally colloidal, while the element, potassium, is provided in the form of potassium alumino-silicate, which is also colloidal.

The double silicate, potassium alumino-silicate, may be produced by forming a paste from aluminum hydroxide, sodium silicate and a potassium salt, mixing the paste at substantially 60 degrees centigrade, then lixiviating this mass to remove soluble matter. After re-drying the resulting substance can be reduced to any desired size of granule, and is ready for use. A sodium salt can be used in lieu of a potassium salt and the final product treated with a brine of a potassium salt which would give a potassium double silicate. The double silicate, potassium alumino-silicate, may also be produced by mixing while at a temperature of 60 degrees C., dilute solutions of sodium aluminate and neutral sodium silicate in such proportions that the mixture contains from 6 to 16% alumina, drying the mixture at a temperature ranging from 80 to 90 degrees C., water washing the mass, re-drying and pulverizing the product and thereafter treating the same with a potassium brine.

The double silicate, ammonium aluminosilicate, may be produced in a more or less analagous manner, i. e. mixing below 20 degrees C., dilute solutions of sodium aluminate and neutral sodium silicate in proportion such that the mixture contains from 6 to 16%, alumina, drying the mixture at temperatures ranging from 80 to 90 degrees C., water washing the mass, re-drying and pulverizing the product and thereafter treating the same with an ammonium brine.

To provide the plant food value, phosphorus, in a suitable form, we bind the phosphorus into an insoluble silicate by fusing a mixture of quartz or sand, an alkali carbonate and phosphate rock in the proportions of

| | Parts |
|---|---|
| Sand or quartz | 20 |
| Alkali carbonate | 20 |
| Phosphate rock | 60 | and treating the fused product with hydrochloric acid and water washing the resultant product to free the same from soluble matter. This product, when added to soils, breaks down slowly, releasing silica and phosphoric acid. Phosphorus may also be fixed as a silicate by mixing silica-gel and metaphosphoric acid in proportions of 1 to 2, drying the mixture at 70 degrees centigrade and water washing the product with warm water. A transparent crystalline substance, having the formula, $SiO(PO_3)_2$, is obtained. This compound is silicyl phosphate. The reaction showing the manner of its formation is as follows:—

$$H_4SiO_4 + 2HPO_3 = SiO(PO_3)_2 + 3H_2O$$

SiO is a divalent radical derived from silicic acid ($H_4SiO_4$). The valence of the radical $PO_3$ is one. Therefore two $PO_3$ radicals are required to combine with one divalent radical SiO.

In many instances, the sludge products hereinbefore described, as normally produced, will contain plant food values in an amount adequate to satisfy the needs of the soil. Should, however, a particular sludge product prove to be deficient in any one of the plant food values, nitrogen, phosphorus or potassium to supply the needs of a particular soil or adapt the same to the requirement of a particular crop, we may incorporate in the sludge a quantity of the appropriate plant food value in the form of ammonium alumino-silicate, or a phosphate of silicon oxide.

Due to the fact that in our improved fertilizer, the plant food values are added to the soil in dispersible colloidal form, it will be appreciated that the plant food values are not leached out of the soil by drainage, but remain available over prolonged periods. It also follows, that since no dissipation of the plant food values occurs, the application of a considerably smaller quantity of plant food values, prepared in accordance with our invention, will effect superior results over those obtained by the addition of much greater quantities of plant food values in the form of soluble mineral salts. One reason for this fact is that the specific surface of the colloids representing the plant food values, is so great that from 5 to 10 parts per million of either of the essential plant food elements is found to be adequate for all plant needs.

Another important factor favoring the addition of plant food values to soils in dispersible colloidal form, resides in the fact that regardless of the excess quantity of plant food values so added, no detrimental effect to either the soil or the crop occurs. This for the reason that the plant food values are, in the main, held in reserve and only released as needed by the plant life. When, on the other hand, soluble mineral salts are added to soil, they immediately go into solution and if an excess of the same be present, the soil is greatly impaired and the crop "burned up." Due to the fact that when the plan food values are added to soil in dispersible colloidal form that become available only as required by the plant life, it follows that a very substantial excess of such plant food values may be added to the soil and that they remain in reserve for use by the plants even over a period covering several seasons. As a result of this fact, the necessity for frequent application of fertilizer to the soil, involving large labor cost, is obviated.

The sludges obtained from polluted organic waste liquids, which we employ in our fertilizer, contain varying percentages of re-dispersible colloidal matter and plant food values. The quantity of re-dispersible colloidal matter and plant food values present in the sludge products, is largely dependent upon the character of the organic waste liquid treated. Waste liquids from the manufacture of strawboard and from the manufacture of cheese, are particularly rich in plant food values and contain in excess of 70% of re-dispersible colloidal matter. The plant food values of these sludges will average approximately 10%. Some of the less concentrated organic wastes yield sludges containing less re-dispersible colloidal matter and less plant food values. The plant food values in such sludges can, of course, if desired, be increased by incorporating therein additional plant food values as hereinbefore set forth.

We do not claim any particular proportions of the ingredients of our fertilizer since these proportions may vary within wide limits, dependent upon the character of the soil to be treated and the crop fertilized. We do find, however, that it is desirable to employ a fertilizer having a dispersible colloidal content in excess of 30%.

The essential characteristics of our fertilizer reside in the fact that the plant food values therein contained are present in dispersible colloidal form and are not subject to leaching out and they are available for assimilation by plant life during its entire period of growth, and that the colloidal matter content of the fertilizer is adequate to materially increase the percent of colloids in the soil to which the fertilizer is applied.

It is to be further understood that when our fertilizer is applied to a soil, portions of the sludge content thereof undergo bacterial decomposition, forming organic acids. As is well known, pulverized limestone is conventionally used to sweeten soil and is furthermore usually present in the sludge of our fertilizer and, therefore, the organic acids resulting from the bacterial decomposition referred to react with the limestone or calcium carbonate, forming organic salts of calcium which base exchange with the alumino silicates both of aluminum and potassium to release nitrogen or potassium as the case may be. The silicyl phosphate is also susceptible to base exchange to release phosphoric acid. There is thus a definite coaction in the soil between the several ingredients of the fertilizer.

The foregoing description is merely illustrative of the invention and it is not to be construed as limiting the scope thereof beyond that defined by the appended claims.

What we claim for our invention is:

1. In a colloidal fertilizer composition the ingredient $SiO(PO_3)_2$ together with ingredients rich in nitrogen and potassium.

2. In a fertilizer composition, the ingredient $SiO_2.P_2O_5$ together with an inorganic fertilizer ingredient containing nitrogen.

3. A fertilizer composition containing $SiO_2.P_2O_5$ and an inorganic ammonium fertilizer compound.

JOHN T. TRAVERS.
OLIVER M. URBAIN.